(12) United States Patent
Sansum et al.

(10) Patent No.: US 9,027,845 B2
(45) Date of Patent: May 12, 2015

(54) VALVES

(75) Inventors: Nigel Paul Sansum, Gloucester (GB); Austin Christopher Bumpsteed, Pershore (GB)

(73) Assignee: Kohler Mira Limited, Cheltenham, Gloucestershire (GB)

( * ) Notice: Subject to any disclaimer, the term of this patent is extended or adjusted under 35 U.S.C. 154(b) by 1243 days.

(21) Appl. No.: 12/742,322

(22) PCT Filed: Nov. 13, 2008

(86) PCT No.: PCT/GB2008/003828
§ 371 (c)(1), (2), (4) Date: Jun. 10, 2010

(87) PCT Pub. No.: WO2009/063204
PCT Pub. Date: May 22, 2009

(65) Prior Publication Data
US 2010/0270384 A1 Oct. 28, 2010

(30) Foreign Application Priority Data
Nov. 13, 2007 (GB) .................................. 0722245.8

(51) Int. Cl.
*G05D 23/13* (2006.01)
*G05D 23/02* (2006.01)

(52) U.S. Cl.
CPC .......... *G05D 23/1353* (2013.01); *G05D 23/022* (2013.01)

(58) Field of Classification Search
CPC ... G05D 23/02; G05D 23/022; G05D 23/025; G05D 23/1346; G05D 23/1353; G05D 23/1306; G05D 23/13; G05D 23/1393
USPC .................................. 236/12.17, 12.1, 12.19
See application file for complete search history.

(56) References Cited

U.S. PATENT DOCUMENTS

| | | | | |
|---|---|---|---|---|
| 781,525 | A * | 1/1905 | Isaacs | 137/636.2 |
| 2,102,011 | A * | 12/1937 | Kysor | 236/12.17 |
| 2,132,689 | A * | 10/1938 | Hermann | 236/12.17 |
| 4,285,465 | A * | 8/1981 | North | 236/12.11 |
| 6,793,145 | B2 * | 9/2004 | Costa e Silva | 236/12.17 |
| 7,240,850 | B2 | 7/2007 | Beck et al. | |
| 7,669,776 | B2 | 3/2010 | Beck et al. | |
| 8,167,215 | B2 * | 5/2012 | Sansum et al. | 236/12.11 |
| 8,517,282 | B2 * | 8/2013 | Sansum et al. | 236/12.11 |
| 2003/0173410 | A1 * | 9/2003 | Ginter et al. | 236/12.2 |
| 2006/0124758 | A1 * | 6/2006 | Sansum et al. | 236/12.11 |
| 2006/0243813 | A1 * | 11/2006 | Beck | 236/12.11 |
| 2010/0123013 | A1 * | 5/2010 | Beck et al. | 236/12.1 |
| 2010/0219255 | A1 * | 9/2010 | Sansum et al. | 236/12.16 |

* cited by examiner

Primary Examiner — Ljiljana Ciric
Assistant Examiner — Alexis Cox
(74) Attorney, Agent, or Firm — Greer, Burns & Crain, Ltd.

(57) ABSTRACT

A thermostatic mixing valve having a manually operable actuator for user selection of water temperature and flow rate, where the actuator is configured to permit both simultaneous and independent adjustment of the water temperature and the flow rate.

16 Claims, 13 Drawing Sheets

VALVES

This invention relates to valves, more specifically to mixing valves and in particular thermostatic mixing valves.

Thermostatic mixing valves are commonly employed to provide a source of temperature controlled water for showering, bathing, hand washing and the like. The known thermostatic mixing valves allow manual user selection of water temperature at delivery and are operable to maintain the user selected water temperature substantially constant. This results in a consistent supply of water at the selected temperature, which is not only more convenient for the user but in many applications is also safer.

Thermostatic mixing valves commonly employ separate controls for user selection of water temperature and flow rate. The provision of separate controls is aesthetically limiting for designers and functionally deficient for a user as simultaneous adjustment of flow rate and temperature requires two hands. Furthermore it might not always be obvious to a user which of the two controls alters the temperature and which alters the flow rate.

The present invention has been made from a consideration of the foregoing and seeks to mitigate the perceived problems and disadvantages of separate controls for adjusting water temperature and flow rate.

Thus, it is a desired object of the present invention to provide a thermostatic mixing valve having a single control for both water temperature and flow rate wherein the control is configured to permit adjustment of water temperature and flow rate either independently of each other or simultaneously.

According to one aspect of the present invention, there is provided a thermostatic mixing valve having a manually operable actuator for user selection of water temperature and flow rate, wherein the actuator is configured to permit adjustment of water temperature and flow rate either independently of each other or simultaneously.

By this invention the user is able to control the water temperature and flow rate of a thermostatic mixing valve independently or simultaneously with one control and so with one hand. Furthermore the user is less likely to be confused as to the means of operation of the mixing valve. Finally the designer of the mixing valve is provided with a new functional aesthetic to develop.

Preferably, the actuator is manually rotatable about a first axis for altering one of the water temperature and flow rate and is pivotal about a second axis for altering the other of the water temperature and flow rate. For example, the water temperature may be adjusted by rotating the actuator with the flow rate being adjusted by pivoting the actuator or vice versa.

Preferably, the first and second axes are mutually perpendicular to one another. For example the first, rotational axis may be arranged on a central longitudinal axis of the mixing valve with the second, pivotal axis being arranged transverse to the longitudinal axis.

Preferably, the mixing valve comprises proportioning valve means for controlling mixing of hot and cold water according to user selection of the outlet water temperature by rotation of the actuator.

Preferably, the proportioning valve means comprises a shuttle valve and the actuator is operatively connected to the shuttle valve by temperature coupling means for setting the user selected outlet water temperature in response to rotational movement of the actuator.

Preferably, the temperature coupling means is configured such that rotating the actuator adjusts the position of a valve member between hot and cold valve seats according to the direction of rotation of the actuator.

Preferably, the temperature coupling means acts on the valve member via a thermostat arranged to monitor the outlet water temperature and adjust the position of the valve member to maintain the selected outlet water temperature substantially constant.

Preferably, the mixing valve comprises flow regulator means for controlling water flow rate according to user selection by tilting of the actuator.

Preferably, the actuator is operatively connected to the flow regulator means by flow coupling means for setting the user selected flow rate in response to pivotal movement of the actuator.

Preferably, the flow coupling means is configured such that pivoting the actuator adjusts the position of a flow control member according to the direction of pivoting the actuator.

Preferably, one of the hot and cold seats is fixed and the flow control member comprises the other seat which is movable relative to the fixed seat to control the flow in response to pivotal movement of the actuator.

Preferably, the valve member comprises a shuttle axially movable between the hot and cold seats to control the outlet water temperature and the movable seat is axially movable towards and away from the fixed seat to vary the area of the flow path between the shuttle and seats to vary the flow.

Preferably, the movable seat is operable to sandwich the shuttle between the seats to stop the flow.

Preferably, the actuator includes a rotatable member for transmitting rotational movement of the actuator to a temperature drive member and a pivotal member for transmitting tilting movement of the actuator to a flow drive member.

Preferably, the pivotal member is mounted on the rotatable member and is operatively connected to the flow drive member so as to permit the pivotal member to rotate with and pivot relative to the rotatable member such that outlet water temperature and flow rate can be adjusted independently by rotating or tilting the actuator separately or simultaneously by rotating and tilting the actuator together.

According to a second aspect of the invention, there is provided an actuator assembly for a mixing valve, the actuator assembly being configured for mounting on a mixing valve for user selection of water temperature and flow rate, wherein the actuator assembly includes a control handle rotatable about a first axis for adjusting one of water temperature and flow rate and pivotal about a second axis normal to the first axis for adjusting the other of water temperature and flow rate, the arrangement being such that water temperature and flow rate can be adjusted either independently of each other or simultaneously.

Preferably, the control handle is operatively connected to a first member rotatable about the first axis and to a second member mounted on the first member and pivotal about the second axis.

The actuator assembly may be used with a thermostatic mixing valve.

According to a third aspect of the invention, there is provided a mixing valve comprising a valve member movable between a hot seat and a cold seat for controlling outlet water temperature, the hot and cold seats being relatively movable towards and away from each other for controlling water flow, and an actuator assembly including a control handle rotatable about a first axis for controlling one of outlet water temperature and flow and pivotal about a second axis transverse to the first axis for controlling the other of outlet water temperature and flow.

Preferably, the mixing valve is a thermostatic mixing valve.

Preferably, the hot and cold seats are relatively movable away from each other to increase water flow and towards each other to decrease water flow.

Preferably, the hot and cold seats are relatively movable towards each other until the valve member is sandwiched between the seats to shut-off water flow.

Preferably, one of the hot and cold seats is fixed and the other seat is movable towards and away from the fixed seat.

Preferably, the control handle is rotatable about the first axis for controlling outlet water temperature and pivotal about the second axis for controlling outlet water flow.

The invention will now be described in more detail by way of example only, with reference to the accompanying drawings, in which:—

Figure 1:
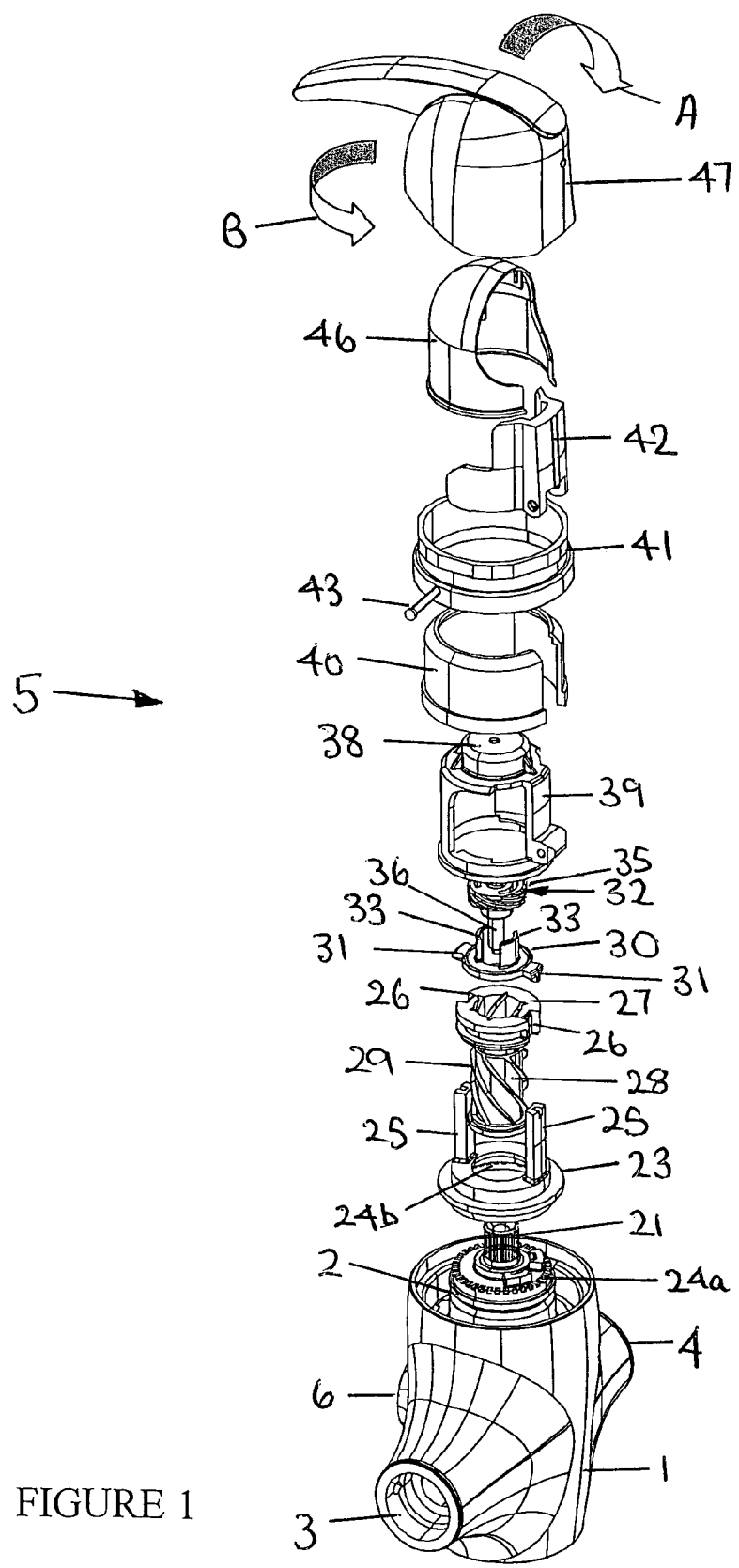
FIG. 1 is an exploded view of the manually operable actuator of a thermostatic mixing valve according to a first embodiment of the invention.

Referring first to FIGS. 1 to 15 of the drawings, FIG. 1 shows a thermostatic mixing valve according to a first embodiment of the invention having a valve body 1 housing a removable thermostatic cartridge unit 2 that is co-operable with inlet ports 3, 4 in the valve body 1.

The inlet ports 3, 4 are connectable to incoming supplies of hot and cold water and the cartridge unit 2 is manually operable by a handle assembly 5 mounted thereon to deliver water having a desired temperature and flow rate according to user selection to an outlet port 6 in the valve body 1 for supply to an ablutionary appliance, for example a shower, bath or hand basin.

Figure 2:
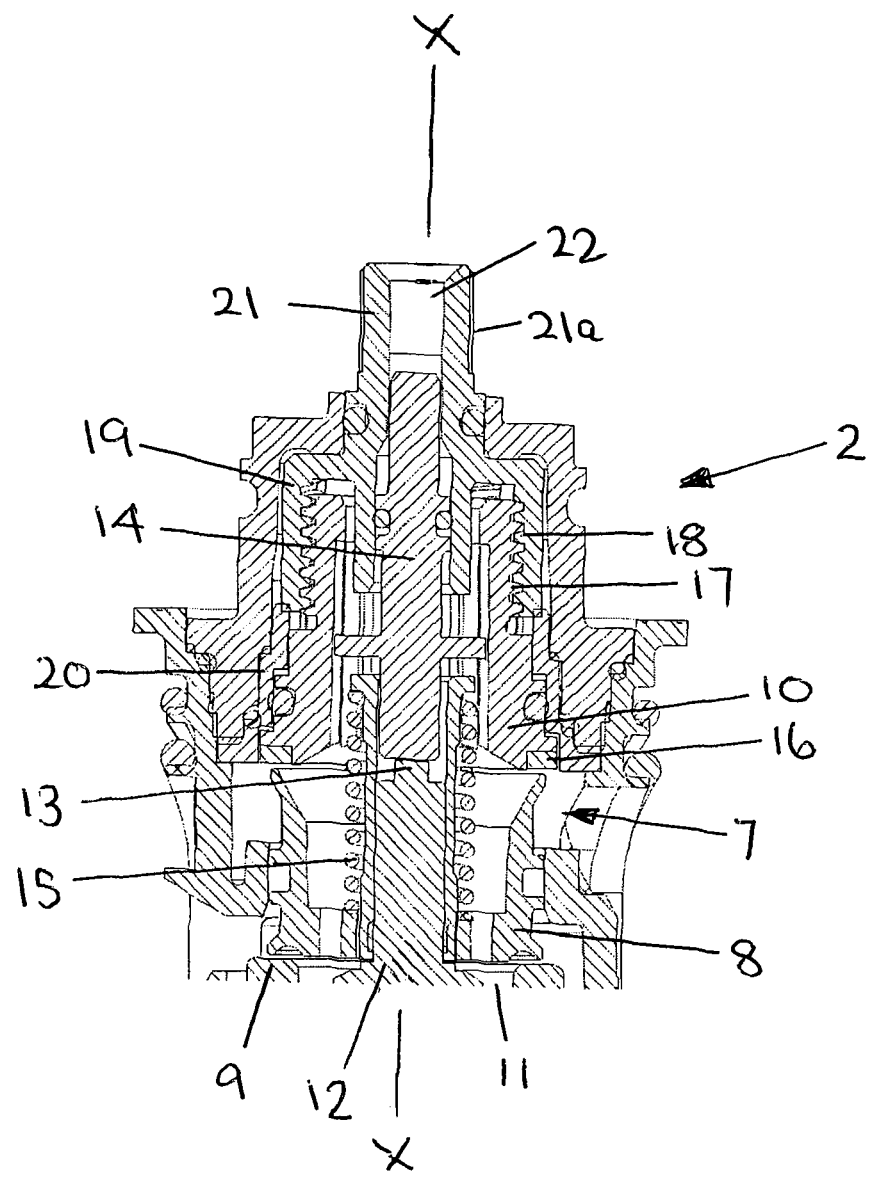
FIG. 2 is a sectional view of part of the cartridge unit of the mixing valve of FIG. 1 showing the valve in a "flow on" position.
Figure 3:
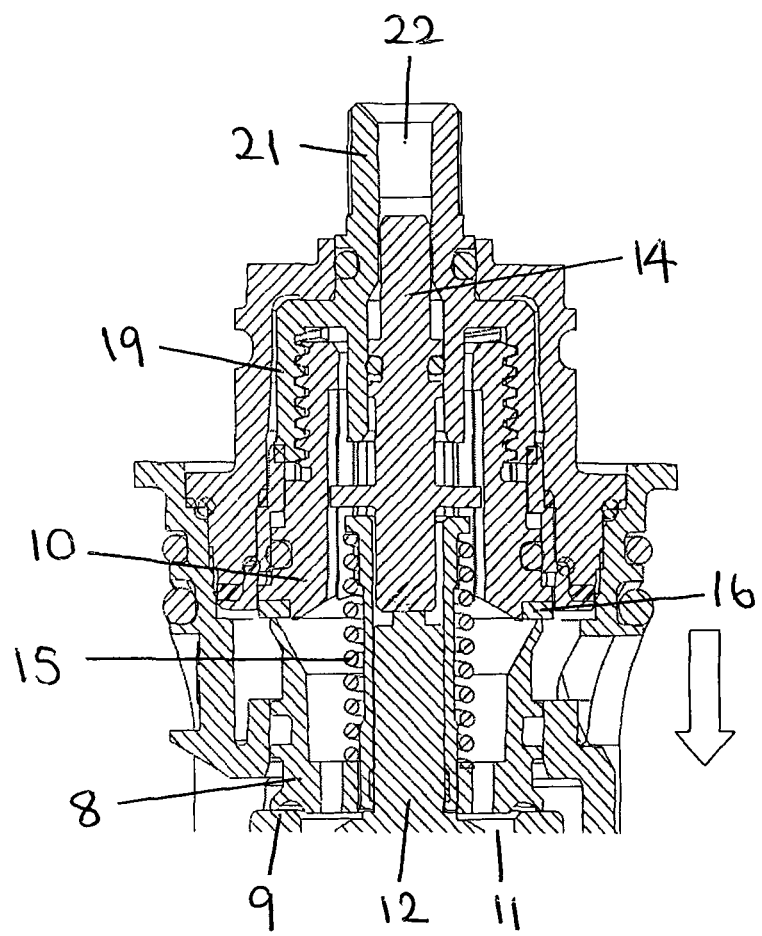
FIG. 3 is a sectional view of the cartridge unit similar to FIG. 2 showing the valve in a "flow off" position.

As best shown in FIGS. 2 and 3, the thermostatic cartridge unit 2 houses a valve assembly 7 for controlling the temperature and flow rate of the water delivered to the outlet port 6.

In this embodiment, the valve assembly 7 comprises a shuttle valve having a shuttle 8 that is axially movable between a hot seat 9 and a cold seat 10 to adjust the relative proportions of hot and cold water admitted to a mixing chamber 11 for controlling the temperature of the water delivered to the outlet port 6.

The hot seat 9 is fixed and the cold seat 10 comprises a flow control member that is axially movable towards and away from the hot seat 9 to turn the flow of water on an off and to adjust the water flow rate. In a modification (not shown) the cold seat 10 is fixed and the hot seat 9 is axially movable towards and away from the cold seat 10 to turn the water flow on and off and to adjust the water flow rate.

The shuttle 8 is mounted on a temperature responsive thermostat 12 arranged to monitor the temperature of the water in the mixing chamber 11. The thermostat 12 contains a thermally responsive material such as wax that expands/contracts uniformly in response to change in water temperature in the mixing chamber 11.

Change in volume of the wax results in a change in the axial length of an actuator rod 13 extending from one end of the thermostat 12. The free end of the actuator rod 13 engages a coupling member 14 under the biasing of a return spring (not shown) that acts on the other end of the thermostat 12.

The shuttle 8 is biased by a spring 15 so as to move with the thermostat 12 and the coupling member 14 is axially movable to position the thermostat 12 and thus the shuttle 8 in response to user selection of a desired outlet water temperature. For a selected outlet water temperature, the position of the coupling member 14 is fixed.

As a result, if the outlet water temperature deviates from the selected temperature, for example due to variations in the pressure and/or temperature of the hot and/or cold supplies, the resulting change in axial length of the actuator rod 13 causes the thermostat 12 to move in the axial direction to re-position the shuttle 8 so that the relative proportions of hot and cold water admitted to the mixing chamber 11 is adjusted to maintain the selected water temperature substantially constant.

The spring 15 allows relative movement between the thermostat 12 and shuttle 8 when the shuttle 8 engages the hot seat 9 in the full cold position and/or under temperature overload conditions and/or when the flow is shut-off. It will be understood that the invention is not limited to the valve assembly above-described and that other valve assemblies may be employed.

The cold seat 10 has an annular sealing ring 16 mounted at one end providing a sealing face for engagement with the shuttle 8. The other end of the cold seat 10 has an external screw thread 17 engageable with a mating internal screw thread 18 of a rotatable sleeve member 19.

The cold seat 10 is prevented from rotating by engagement with a cold seat housing 20 so that rotation of the sleeve member 19 is converted into axial movement of the cold seat 10 towards and away from the hot seat 9 according to the direction of rotation of the sleeve member 19.

The sleeve member 19 has a spindle 21 that protrudes from the cartridge unit 2 by means of which the sleeve member 19 can be rotated by the handle assembly 5 to turn the flow on and off and to adjust the flow rate.

FIG. 2 shows the valve in the "flow on" position corresponding to the maximum flow rate and FIG. 3 shows the valve in the "flow off" position.

Starting from the position shown in FIG. 2, rotation of the sleeve member 19 to move the cold seat 10 towards the hot seat 9 reduces the flow areas between the hot and cold seats 9, 10 so that the outlet flow is reduced until the shuttle 8 is sandwiched between the hot and cold seats 9, 10 to shut-off the flow as shown in FIG. 3.

The spindle 21 of the sleeve member 19 has a stepped through bore 22 that opens to the interior of the cartridge unit 2. The upper end of the coupling member 14 is slidably received in the bore 21 by means of which the coupling member 14 can be axially moved by the handle assembly 5 to adjust the selected water temperature.

The handle assembly 5 includes a fixed base 23 located onto the thermostatic cartridge unit 2 by a series of castellations 24a, 24b present on both the top surface of the thermostatic cartridge unit 2 and the fixed base 23 respectively. The castellations 24a, 24b co-operate to prevent the fixed base 23 rotating relative to the thermostatic cartridge unit 2.

The fixed base 23 possesses two vertically orientated locating pegs 25 received in mating slots 26 in the outer surface of an annular flow collar 27 to prevent the flow collar 27 rotating relative to the fixed base 23 while allowing the flow collar 27 to move up and down relative to the fixed base 23.

The flow collar 27 surrounds a cylindrical flow drive worm 28. Protrusions (not shown) on the inside surface of the flow collar 27 interact with a thread 29 on the flow drive worm 28 causing the flow drive worm 28 to rotate as the collar 27 moves up and down.

The flow drive worm 28 has internal axial splines (not shown) that cooperate with external axial splines 21a on the spindle 21 for transmitting rotation of the flow drive worm 28 to the spindle 21 for rotating the sleeve member 19 to adjust the flow rate of water delivered to the outlet port 6 of the mixer as described previously.

A temperature drive guide 30 sits atop the fixed base 23 and has two protrusions 31 that cooperate with the locating pegs 25 to prevent the temperature drive guide 30 rotating relative to the fixed base 23.

The temperature drive guide 30 supports a temperature drive nut 32 and has two upstanding flanges 33 received in mating slots 34 in the temperature drive nut 32 to prevent the temperature drive nut 32 rotating relative to the temperature drive guide 30 while allowing the temperature drive nut 32 to be driven up and down relative to the temperature drive guide 30.

The temperature drive nut 32 has a circular cross-section with a thread 35 on its outer surface and a cylindrical peg 36 that extends from the underside. The thread 35 of the temperature drive nut 32 cooperates with an internal thread 37 (see FIGS. 8 and 9) in a dome section 38 of a temperature control base 39.

The control base 39 is rotatable relative to the fixed base 23 causing the temperature drive nut 32 to move up and down as the control base 39 rotates. The peg 36 is arranged to pass through the cylindrical flow drive worm 28 and enter the through bore 22 of the spindle 21 for transmitting axial movement of the drive nut 32 to the coupling member 14 to adjust the outlet water temperature as described previously.

The control base 39 is prevented from moving in the axial direction by a clamp 40 secured by a headnut 41 screwed onto an internal thread (not shown) on the valve body 1. The clamp 40 serves to secure the fixed base 23, flow drive worm 28, flow collar 27, temperature drive guide 30, temperature drive nut 32 and control base 39 against the thermostatic cartridge unit 2.

A flow control lever 42 is secured to the control base 39 by a pin 43 for pivotal movement about the axis of the pin 43 and has two internal coupling pins 44 (see FIG. 14) that locate in complementary circumferentially extending recesses 45 in the outer surface of the flow collar 27 between the slots 26.

A cover dome 46 fits on top of the whole assembly and a control handle 47 on top of that. The position of the control handle 47 is fixed on assembly relative to the rotating control base 39 and the control lever 42 such that rotating the control handle 47 causes rotation of the control base 39 and tilting of the control handle 47 causes tilting of the control lever 42.

In this embodiment, the rotational axis of the control handle 47 is coaxial with the longitudinal axis X of the mixing valve and the pivot axis of the control handle 47 is normal thereto. This may not be essential and other arrangements of the axes may be employed.

In operation, the control handle 47 can be tilted in the direction of arrow A or rotated in the direction of arrow B or a combination of the two.

If the control handle 47 is rotated, the control base 39 correspondingly rotates. This causes the internal thread 37 in the dome section 38 to engage with the thread 35 on the temperature drive nut 32 to raise or lower the cylindrical peg 36 depending on the direction of rotation.

The thermostat 12 and coupling member 14 within the thermostatic cartridge unit 2 are biased towards the peg 36 by the return spring (not shown) in the thermostatic cartridge unit 2. As a result, axial movement of the peg 36 is transmitted to the thermostat 12 according to user selection of the outlet water temperature.

The valve shuttle 8 is mounted on the thermostat 12 and moves with the thermostat 12 to adjust the relative proportions of hot and cold water admitted to the mixing chamber 11 in response to user selection of the outlet water temperature.

If the outlet water temperature deviates from the selected temperature, the thermostat 12 responds to adjust the position of the shuttle 8 to maintain the selected outlet water temperature substantially constant.

If the handle 47 is tilted, the control lever 42 is correspondingly tilted about the pin 43. This causes the coupling pins 44 on the inside of the control lever 42 to raise or lower the flow collar 27 on the locating pegs 25 depending on the tilt direction.

Protrusions (not shown) on the inside surface of the flow collar 27 interact with the thread 29 on the flow drive worm 28 causing the flow drive worm 28 to rotate as the collar 27 moves up and down.

Rotation of the flow drive worm 28 is transmitted to the spindle 21 to rotate the sleeve member 19 to move the cold seat 10 to adjust the flow rate of the water delivered from the outlet port 6.

Rotating and tilting of the handle 47 may be conducted simultaneously such that the user may adjust water delivery temperature and flow rate in a single action using a single hand.

The flow control function is shown in more detail in FIGS. 4 to 7. In the position of the handle 47 in FIG. 4 the flow of water is stopped and the control lever 42 is in the position shown in FIG. 6 in which the flow collar 27 is lowered.

Figure 4:
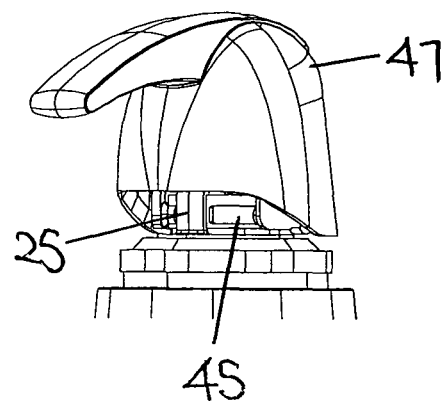
FIG. 4 is a side view of the actuator in the "flow off" position.
Figure 5:
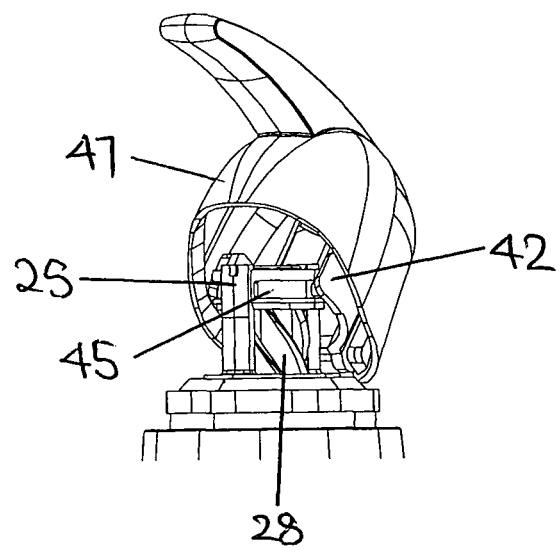
FIG. 5 is a side view of the actuator in the "flow full on" position.
Figure 6:
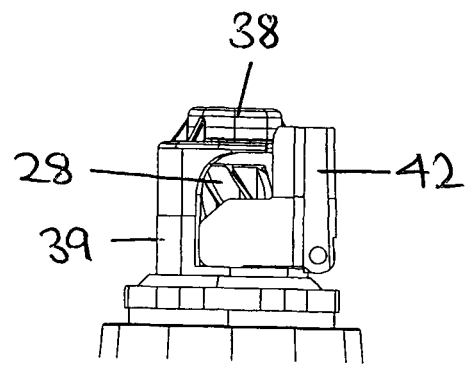
FIG. 6 is a side view of the actuator with some parts removed and showing the rotating control base limiting tilt of the lever in the "flow off" position.
Figure 7:
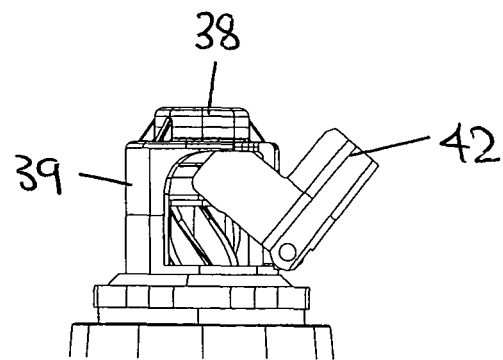
FIG. 7 is a side view of the actuator with some parts removed and showing the rotating control base limiting tilt of the lever in the "flow full on" position.

The handle 47 can be tilted from the position shown in FIG. 4 to the position shown in FIG. 5 causing the control lever 42 to tilt from the position shown in FIG. 6 to the position shown in FIG. 7.

As the control lever 42 tilts towards the position shown in FIG. 7, the flow collar 27 is raised by engagement of the coupling pins 44 on the control lever 42 in the recesses 45 of the flow collar 27 causing the flow drive worm 28 to rotate.

Rotation of the flow drive worm 28 is transmitted to the spindle 21 to rotate the sleeve member 19 and move the cold seat 10 away from the hot seat 9 to increase the flow of water up to a maximum at the position of the control lever 42 shown in FIG. 7.

As will be appreciated, the handle 47 can be tilted from the position shown in FIG. 4 to the position shown in FIG. 5 and any intermediate positions to provide any desired flow rate of water.

The control lever 42 is prevented from movement beyond the end positions shown in FIGS. 6 and 7 by abutment of the control lever 42 with the control base 39.

The thread 29 on the flow drive worm 28 is geared so that movement of the handle 47 to the end positions (limited by the control base as described), corresponds to no flow and maximum flow, ensuring the full range of flow control for the user.

It should be noted that although the arrangement illustrated in FIGS. 4 to 7 is designed such that there is no water flow when the handle 47 is in a non-tilted position (FIG. 4) and there is maximum water flow when the handle 47 is in its maximum tilted position (FIG. 5), a simple modification to the invention could reverse this control mechanism.

The temperature control function is shown in more detail in FIGS. 8 to 12. The thread 37 on the inside of the dome portion 38 of the control base 39 is engaged with the thread 35 on the temperature drive nut 32. The control base 39 is rotatable with the handle 47 and the temperature drive nut 32 is prevented from rotating by the temperature drive guide 30.

Figure 8:
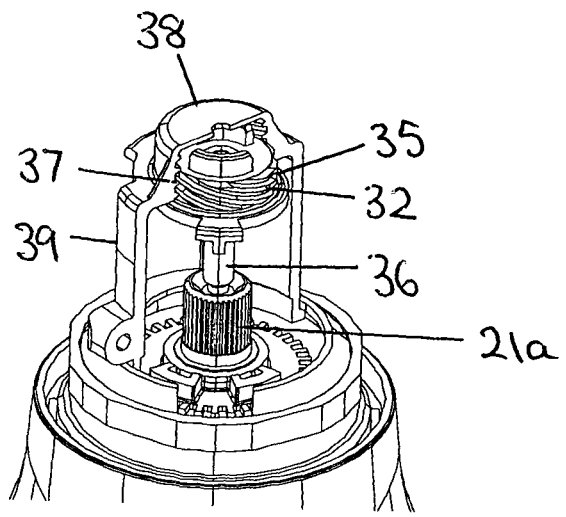
FIG. 8 is a side view of the actuator with some parts removed and cut-away to show the temperature drive assembly in the "full cold" position.
Figure 9:
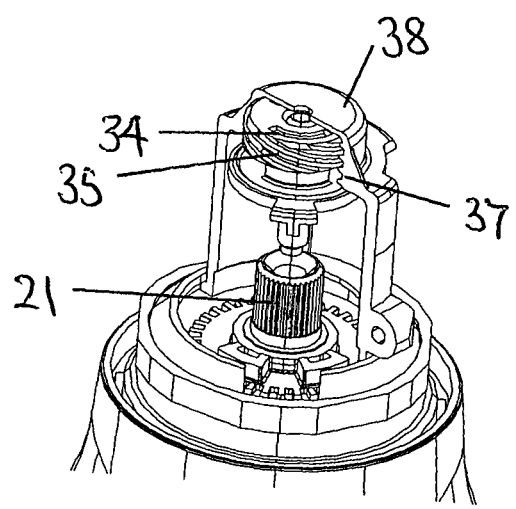
FIG. 9 is a side view of the actuator with some parts removed and cut-away to show the temperature drive assembly in the "full set hot" position.

As a result, when the handle 47 is rotated, the temperature drive nut 32 slides up and down the flanges 33 raising and lowering the cylindrical peg 36 according to the direction of rotation between the end positions shown in FIGS. 8 and 9 for adjusting the position of the thermostat 12 and shuttle 8 according to user selection of the outlet water temperature.

FIG. 8 shows the position of the cylindrical peg 36 in which the shuttle 8 is adjusted to provide flow of cold water only (full cold) and FIG. 9 shows the position of the cylindrical peg 36 in which the shuttle 8 is adjusted to provide flow of hot water to the maximum preset temperature (full set hot).

As will be appreciated the handle 47 can be rotated to adjust the shuttle valve assembly to provide any desired outlet water temperature from full cold to full set hot.

Adjustment of the axial position of the cylindrical peg 36 beyond the end positions shown in FIGS. 8 and 9 is prevented by engagement of the control base 39 with the locating pegs 25 at the extremes of rotation thus limiting rotation of the control base 39.

Figure 10:
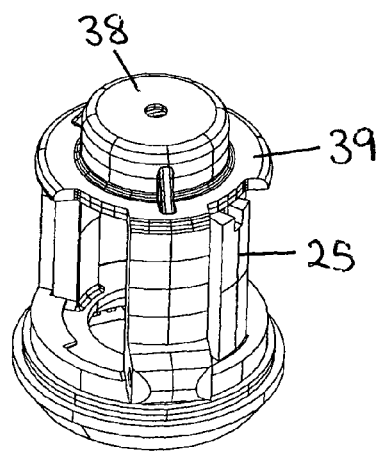
FIG. 10 is a side view of the actuator with some parts removed to show the rotating control base in the "full cold" position.
Figure 11:
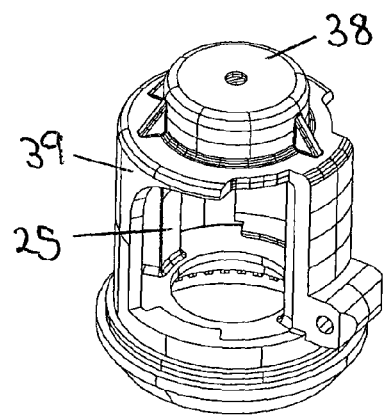
FIG. 11 is a side view of the actuator with some parts removed to show the rotating control base in an intermediate position between the "full cold" position and the "full set hot" position.
Figure 12:
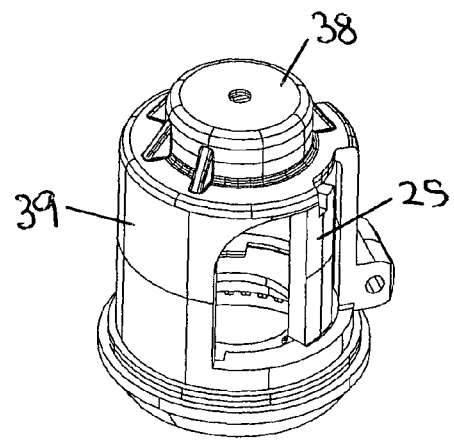
FIG. 12 is a side view of the actuator with some parts removed to show the rotating control base in the "full set hot" position.

FIG. 10 shows the end position of the control base 39 corresponding to full cold and FIG. 12 shows the end position of the control base 39 corresponding to full set hot. FIG. 11 shows an intermediate position of the control base 39 corresponding to an outlet water temperature between full cold and full set hot.

The threads 37 on the inside of the dome portion 38 and the threads 35 of the temperature drive nut 32 are configured such that the full range of temperatures required is achieved given the permitted rotational movement of the control base 39, ensuring the full range of temperature control for the user.

Figure 13:
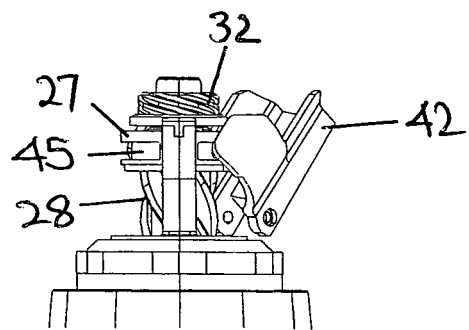
FIG. 13 is a side view of the actuator with some parts removed to show the lever in the "flow full on" position and the temperature control assembly in the "full cold" position.
Figure 14:
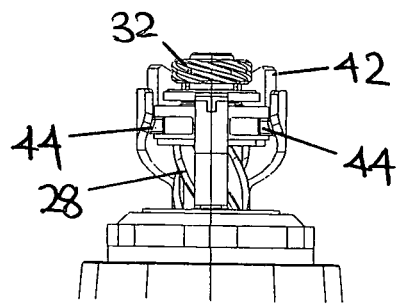
FIG. 14 is a side view of the actuator with some parts removed to show the lever in the "flow full on" position and the temperature control assembly in an intermediate position between the "full cold" position and the "full set hot" position.
Figure 15:
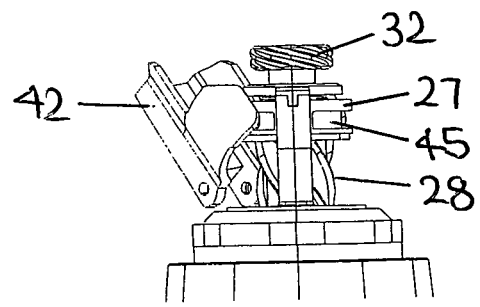
FIG. 15 is a side view of the actuator with some parts removed to show the lever in the "flow full on" position and the temperature control assembly in the "full set hot" position.

The relationship between the temperature control function and the flow control function is shown in more detail in FIGS. 13 to 15. As will be apparent from the description already provided, if the handle 47 is rotated, the control base 39 will rotate to adjust the outlet water temperature and, as the control lever 42 is pivotally mounted on the control base 39, the control lever 42 will also rotate with the control base 39.

This rotation of the control lever 42 does not change the flow rate however as the pins 44 on the control lever 42 run freely in the circumferential recesses 45 in the flow collar 27 and so the axial position of the flow collar 27 is not adjusted. In this way, the temperature control function can be operated independently of the flow control function.

If the handle 47 is tilted, the control lever 42 is tilted and the engagement of the pins 44 in the recesses 45 cause the flow collar 27 to move up or down according to the direction of tilting thus rotating the flow drive worm 28 and spindle 21 to move the cold seat 10 to alter the delivered water flow rate.

This tilting of the control lever 42 does not change the outlet water temperature however as the control base 39 is not rotated. In this way, the flow control function can be operated independently of the temperature control function.

If the handle 47 is tilted and rotated together, both the flow control and temperature control functions are operated to adjust the outlet water flow rate and temperature simultaneously with one hand, through one control.

As will be appreciated, the handle assembly 5 can be fitted to new and/or existing thermostatic valves allowing control of water temperature and flow rate with a single control as described.

Figure 16:
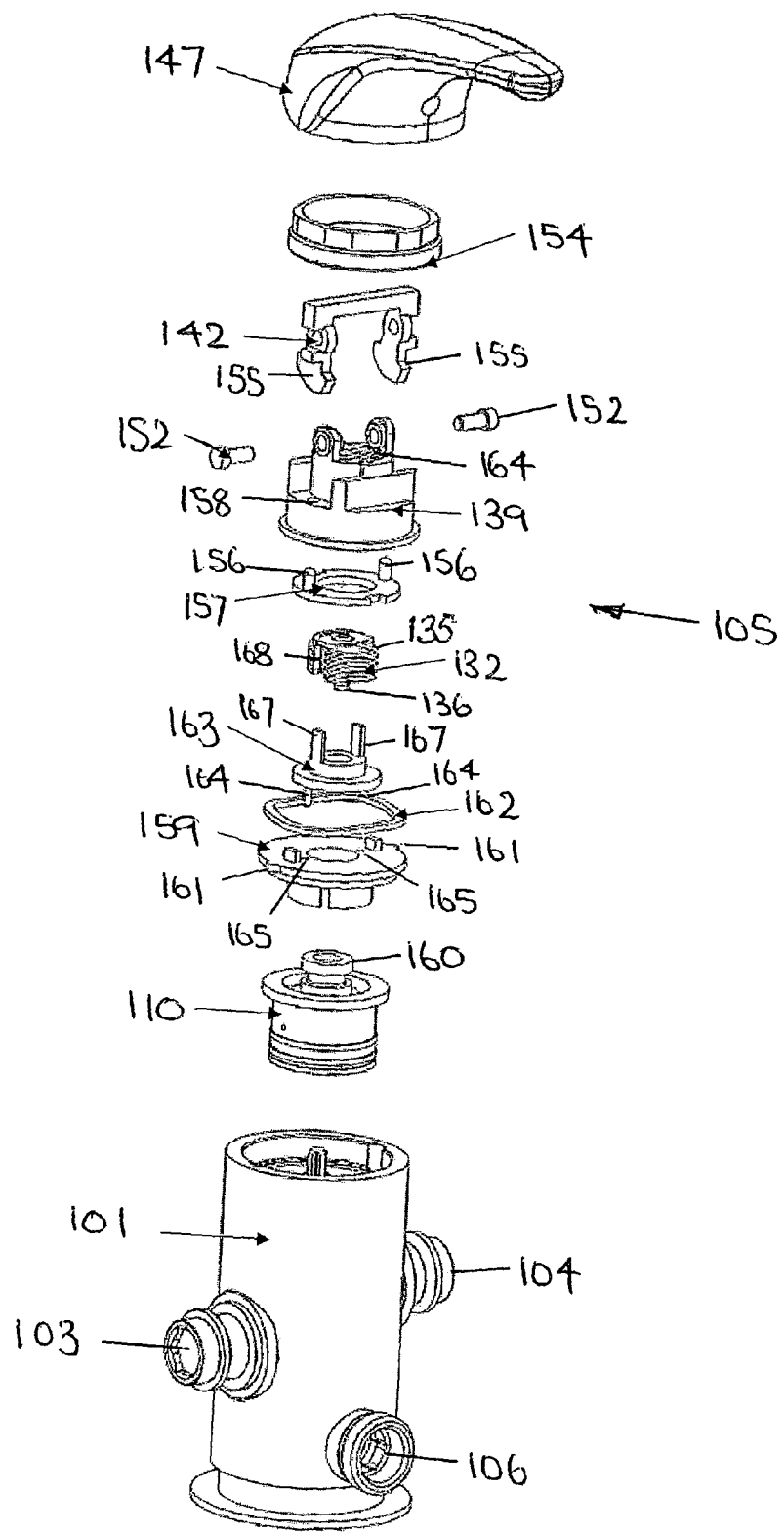
FIG. 16 is an exploded view of the manually operable actuator of a thermostatic mixing valve according to a second embodiment of the invention.

Referring now to FIGS. 16 to 21 of the drawings, FIG. 16 shows a thermostatic mixing valve according to a second embodiment of the invention.

In this embodiment, the valve assembly 107 is mounted directly in the valve body 101 in contrast to the previous embodiment in which the valve assembly is incorporated in a cartridge unit. The valve assembly 107 again comprises a shuttle valve for controlling the temperature and flow rate of water delivered to an outlet port 106.

The shuttle valve has a shuttle 108 that is axially movable between a hot seat 109 and a cold seat 110 to adjust the relative proportions of hot and cold water admitted to a mixing chamber 111 from inlet ports 103, 104 for controlling the temperature of the water delivered to the outlet port 106.

The hot seat 109 is fixed and the cold seat 110 is mounted in the body 101 for axial sliding movement towards and away from the hot seat 109 to turn the flow of water off and on and to adjust the water flow rate. In a modification (not shown), the cold seat may be fixed and the hot seat movable towards and away from the cold seat to control the flow.

Figures 17, 18:
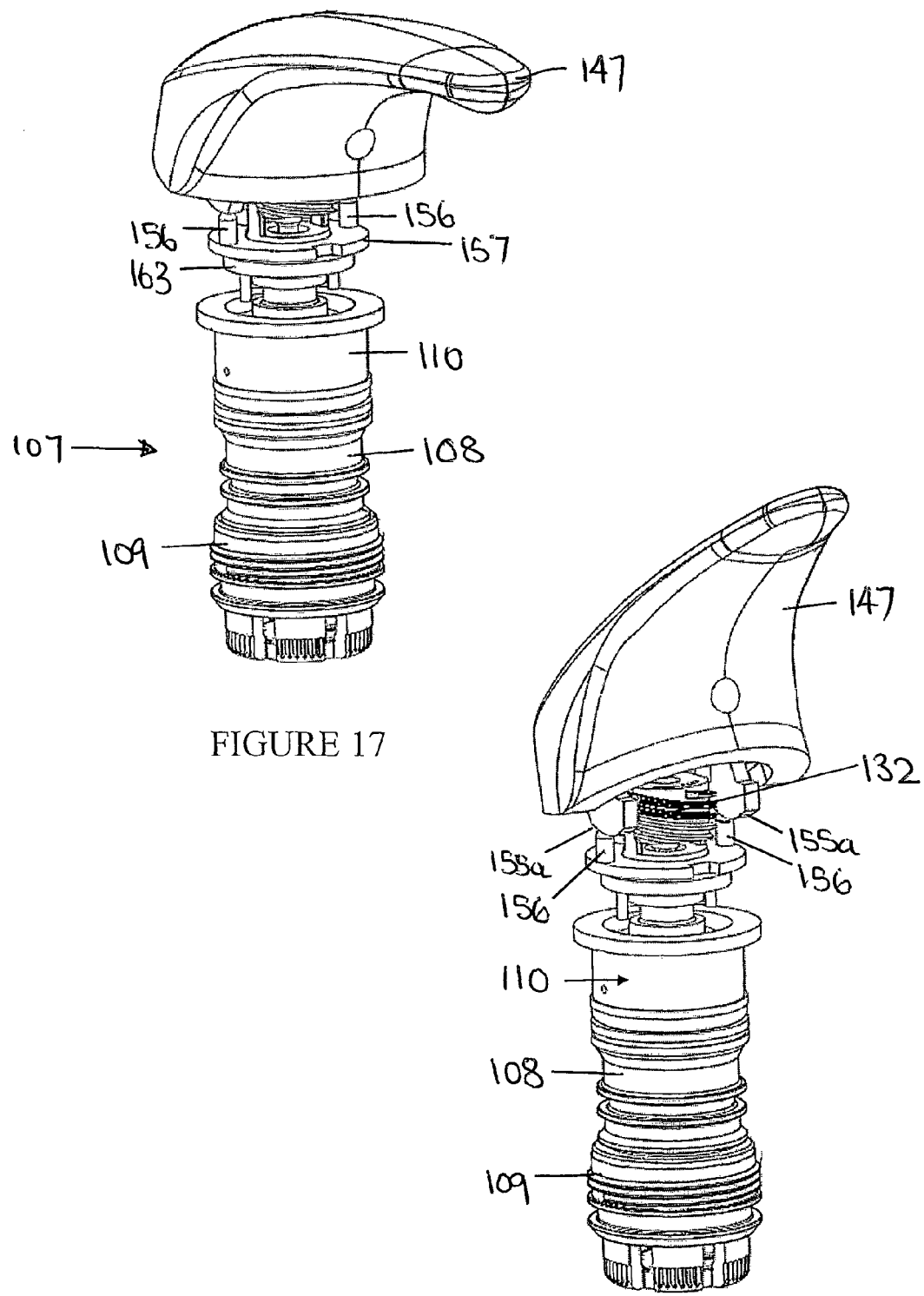
FIG. 17 is a perspective view of the actuator and valve assembly in a "flow-off" position.
FIG. 18 is a perspective view similar to FIG. 17 with the actuator and valve assembly in a "flow-on" position.

FIG. 17 shows the "flow off" position in which the cold seat 110 is moved towards the hot seat 109 until the shuttle 108 is sandwiched between the hot and cold seats 109, 110 to prevent flow through the valve. FIG. 18 shows the "flow on" position in which the cold seat 110 is moved away from the hot seat 109 to allow flow through the valve.

The range of movement of the cold seat 110 towards and away from the hot seat 109 is variable according to operation of the handle assembly 105 to turn the flow off and on and to adjust the flow rate as described in more detail later.

As in the previous embodiment, the shuttle 108 is mounted on a temperature responsive thermostat 112 arranged to monitor the temperature of the water in the mixing chamber 111. The thermostat 112 contains a thermally responsive material such as wax that expands/contracts uniformly in response to change in water temperature in the mixing chamber 111.

Change in volume of the wax results in a change in the axial length of an actuator rod 113 extending from one end of the thermostat 112. The free end of the actuator rod 113 engages a coupling member 114 under the biasing of a return spring 150 that acts on the other end of the thermostat 112.

The shuttle 108 is biased by a spring 115 so as to move with the thermostat 112 and the coupling member 114 is axially movable to position the thermostat 112 and thus the shuttle 108 in response to user selection of a desired outlet water temperature. For a selected outlet water temperature, the position of the coupling member 114 is fixed.

As a result, if the outlet water temperature deviates from the selected temperature, for example due to variations in the pressure and/or temperature of the hot and/or cold supplies, the resulting change in axial length of the actuator rod 113 causes the thermostat 112 to move in the axial direction to re-position the shuttle 108 so that the relative proportions of hot and cold water admitted to the mixing chamber 111 is adjusted to maintain the selected water temperature substantially constant.

Figure 19:
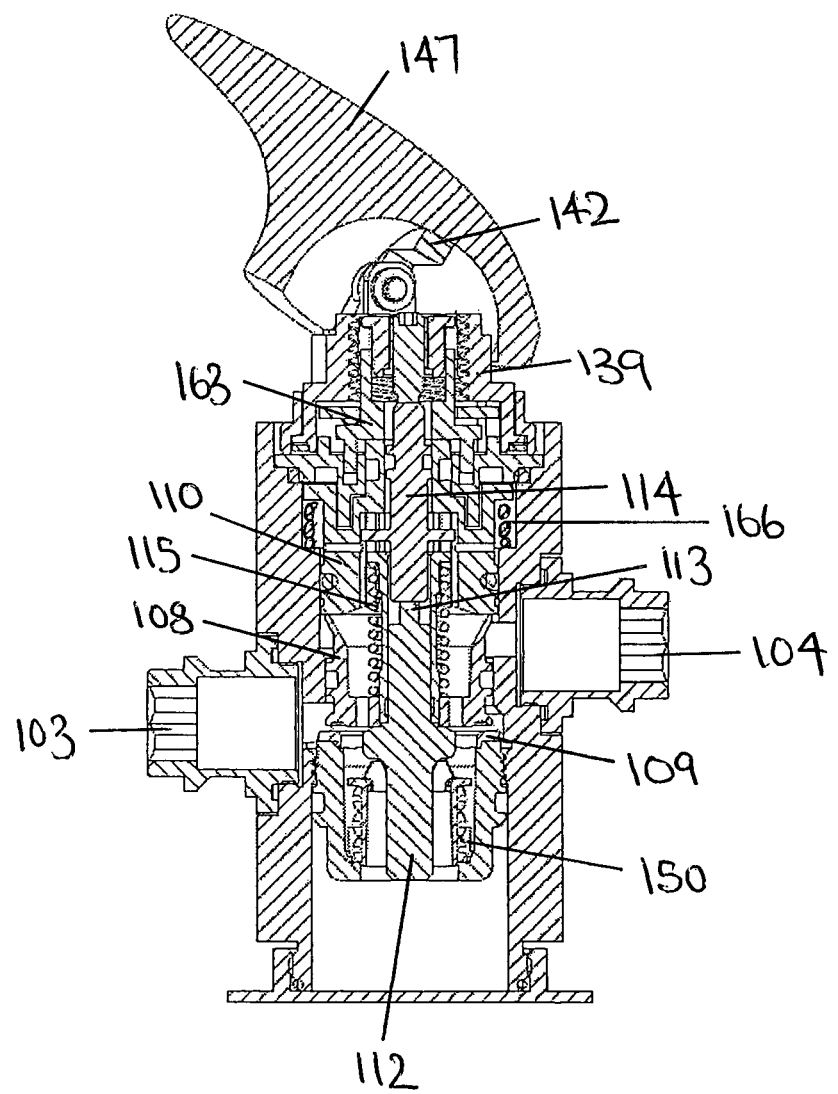
FIG. 19 is sectional view of the actuator and mixing valve of FIG. 16 with the actuator and valve assembly in a "full set hot" position.
Figure 20:
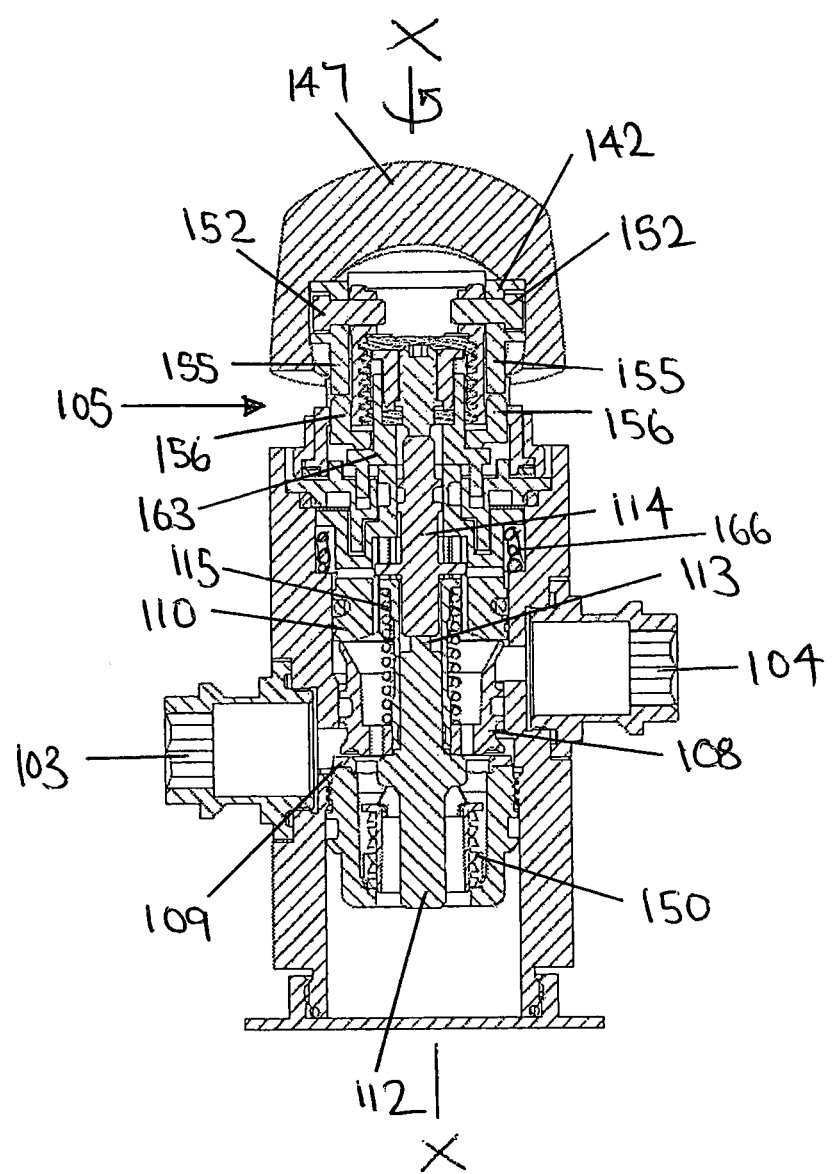
FIG. 20 is a sectional view similar to FIG. 19 with the actuator and valve assembly in an intermediate position between "full set hot" and "full cold" positions.
Figure 21:
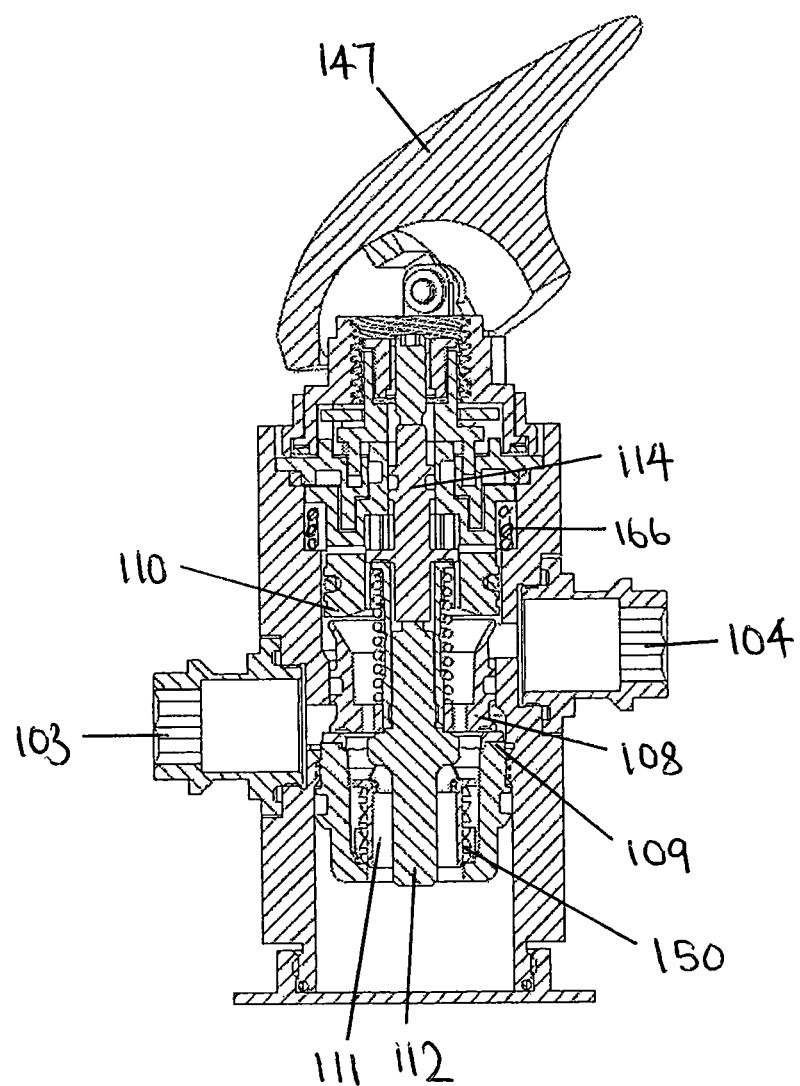
FIG. 21 is a sectional view similar to FIG. 20 with the actuator and valve assembly in the "full cold" position.

FIGS. 19 and 21 show the coupling member 114 in the "full set hot" position and "full cold" position respectively and FIG. 20 shows the coupling member 114 in a position intermediate the "full set hot" and "full cold" positions. The range of movement of the coupling member 114 is variable according to operation of the handle assembly 105 to adjust the outlet water temperature as described in more detail later.

The return spring 150 biases the thermostat 112 to follow movement of the coupling member 114 and the shuttle spring 115 allows relative movement between the thermostat 112 and shuttle 108 when the shuttle 108 engages the hot seat 109 in the full cold position and/or under temperature overload conditions and/or when the flow is shut-off. It will be understood that the invention is not limited to the valve assembly above-described and that other valve assemblies and thermostats may be employed.

The handle assembly 105 includes a control handle 147 mounted on a control base 139 by a pair of pegs 152 for pivotal movement about the axis of the pegs 152 normal to the longitudinal axis X of the mixing valve.

A flow control lever 142 is also mounted on the control base 139 by the pegs 152 and is pivotal about the pivot axis in response to pivotal movement of the control handle 147.

The control base 139 is mounted and retained on the valve body 101 by a head nut 154 for rotational movement about an axis coaxial with the longitudinal axis X of the mixing valve in response to angular adjustment of the control handle 147.

The control lever 142 has a pair of cams 155 co-operable with pins 156 on a cam ring 157 located on the underside of the control base 139 with the pins 156 extending through holes 158 in the control base 139 for engagement with profiled faces 155a on the cams 155.

The profiled faces 155a are configured to control movement of the cam ring 157 up and down in an axial direction parallel to the longitudinal axis X in response to pivotal movement of the control handle 147.

A sealing cover 159 fits over the cold seat 110 and has a central opening through which a boss 160 on the cold seat 110 projects. The sealing cover 159 is located against rotation about longitudinal axis X by a pair of tabs 161 on the periphery that engage corresponding recesses (not shown) in the valve body 101.

The control base 139 is rotatable relative to the sealing cover 159 via a bearing 162. A cold seat cap 163 seats on the boss 160 and is prevented from rotating about longitudinal axis X by a pair of axially extending pins 164 that engage holes 165 in the cover 159.

The cam ring 157 sits on top of the cold seat cap 163 and can rotate with the control base 139 relative to the cold seat cap 163 about longitudinal axis X.

A spring 166 acts between the cold seat 110 and valve body 101 to bias the cold seat 110 and cold seat cap 163 towards the cam ring 157.

In this way the cold seat cap 163 and cold seat 110 can respond to axial movement of the cam ring 157 in response to pivotal movement of the control handle 147 while angular movement of the control handle 147 about the longitudinal axis X has no effect on the axial position of the cold seat cap 163 and thus the axial position of the cold seat 110.

The control base 139 has a central opening with an internal screw thread 164 engageable with an external screw thread 135 of a temperature drive nut 132. The cold seat cap 163 has a pair of axially extending posts 167 that slidably engage a pair of slots 168 in the peripheral edge of the drive nut 132 to prevent rotational movement of the drive nut 132 about longitudinal axis X while allowing up and down movement of the drive nut 132 on the posts 167.

In this way rotational movement of the control base 139 about longitudinal axis X is converted into axial movement of the drive nut 132. The cold seat 110 has a central through bore from which the coupling member 114 projects to engage a peg 136 on the underside of the drive nut 132.

In operation, the control handle 147 can be tilted in the direction of arrow A or rotated in the direction of arrow B or a combination of the two.

In the flow off position shown in FIG. 17, the shuttle 108 is sandwiched between the hot and cold seats 109, 110. In this position, the cams 155 on the control lever 142 co-operate with the pins 156 on the cam ring 157 to prevent lifting of the cam ring 157 which in turn prevents lifting of the cold seat cap 159 and cold seat 110 under the biasing of the cold seat spring 166.

If the control handle 147 is pivoted from the position shown in FIG. 17 towards the position shown in FIG. 18, the control lever 142 pivots with the handle 147 and the profile of the cams 155 co-operating with the pins 156 on the cam ring 157 changes to allow lifting of the cam ring 157 which in turn allows lifting of the cold seat cap 159 and cold seat 110 under the biasing of the cold seat spring 166.

As a result the cold seat 110 moves away from the hot seat 109 to allow water to flow through the valve and continued pivotal movement of the control handle 147 towards the position shown in FIG. 18 results in a gradual increase in the flow rate as the cold seat 110 moves further away from the hot seat 109.

Conversely, if the control handle 147 is pivoted from the position shown in FIG. 18 towards the position shown in FIG. 17, the control lever 142 pivots with the handle 147 and the profile of the cams 155 co-operating with the pins 156 on the cam ring 157 changes to lower the cam ring 157 which in turn lowers the cold seat cap 159 and cold seat 110 against the biasing of the cold seat spring 166.

As a result the cold seat 110 moves towards the hot seat 109 gradually reducing the flow until the shuttle 108 is again sandwiched between the hot and cold seats 109, 110 to cut off the flow.

During this operation, the thermostat 112 responds to the temperature of the water flowing through the mixing chamber 111 to position the shuttle 108 to achieve and maintain the water temperature selected by the angular position of the control handle 147.

As a result, if the control handle 147 is pivoted but not rotated, the water flow rate will change according to the direction of movement but the water temperature will remain the same.

The water outlet temperature can be altered by rotating the control handle 147 about the axis X.

In one direction of rotation, the temperature drive nut 132 is lowered. The resulting movement of the peg 136 in the axial direction is transmitted to the coupling member 114 to move the thermostat 112 against the biasing of the return spring 150 to adjust the position the shuttle 108 to reduce the outlet water temperature.

In the other direction of rotation, the temperature drive nut 132 is raised. The resulting movement of the peg 136 in the axial direction is followed by the thermostat 112 and coupling member 114 under the biasing of the return spring 150 to adjust the position of the shuttle 108 to increase the outlet water temperature.

During this operation, if the control handle 147 is rotated but not pivoted, the outlet water temperature will change according to the direction of rotation of the control handle 147 but the flow area and thus the flow rate will remain the same.

Thus, as with the first embodiment, the second embodiment allows the flow rate and water temperature to be adjusted independently of each other by pivotal movement or rotational movement only of the control handle 147.

Alternatively, the flow rate and water temperature can be adjusted simultaneously by a combination of pivotal and rotational movement of the control handle 147 at the same time.

In this embodiment, the rotational axis of the control handle 147 is coaxial with the longitudinal axis X of the mixing valve and the pivot axis of the control handle 147 is normal thereto. This may not be essential and other arrangements of the axes may be employed.

It should also be noted that, although the arrangement illustrated in FIGS. 16 to 21 is designed such that the control handle 147 is rotatable to control water temperature and pivotal to control flow rate, alternative arrangements may be employed in which this is reversed so that rotational movement controls flow rate and pivotal movement controls water temperature.

Alternatively or additionally, while the flow-off condition corresponds to a non-tilted position of the control handle shown in FIG. 17 and the full flow condition corresponds to the maximum tilted position of the control handle 147 shown in FIG. 18, it will be understood that this arrangement could be reversed so that the non-tilted position corresponds to maximum flow and the fully tilted position correspond to no flow.

It will be appreciated that there are several benefits to the invention described above.

First, the thermostatic control of the outlet water increases regularity of the water supply and in many applications would increase user safety.

Second, the user can control the delivery flow rate and temperature of thermostatically regulated water independently or simultaneously. This offers a new level of control to users of thermostatically controlled systems.

Third, the above mentioned level of control is achieved with a single control using one hand. One benefit of this is that it leaves the other hand free to perform other tasks.

Fourth, the control is suitable for use with a variety of flow and temperature control mechanisms in mixing valves to suit a wide variety of plumbing systems.

Fifth, the designer is afforded increased freedom for aesthetic design of thermostatic mixing valves.

Other benefits and advantages of the above described invention will be apparent to those skilled in the art and it will be understood that the invention is not limited to the embodiments above-described and that various modifications and improvements can be made without departing from the various concepts described herein.

Thus, while the invention has been described with reference to thermostatic mixing valves, the actuator may be employed to control outlet water temperature and flow in a non-thermostatic mixing valve.

Moreover, while the invention has been described with reference to thermostatic mixing valves in which water flow is controlled by relative movement of opposed valve seats, it will be understood that other means of controlling the outlet water flow may be employed in both thermostatic and non-thermostatic mixing valves.

Furthermore, it will be understood that thermostatic mixing valves having a single control for water temperature and flow rate may be provided in a range of ablutionary fittings for showering, bathing, hand washing and the like. For example, taps for baths and basins and bath/shower mixers may benefit from single control of water temperature and flow rate as described herein.

Finally, it will be appreciated that any of the features described herein may be employed separately or in combination with any other features and the invention extends to and includes all combinations and sub-combinations of one or more features described herein in any form of apparatus for delivering water.

The invention claimed is:
1. A thermostatic mixing valve comprising:
a manually operable actuator for user selection of water temperature and flow rate,
a proportioning valve for controlling mixing of hot and cold water according to user selection of outlet water temperature, said proportioning valve comprising a valve member movable between hot and cold seats to set the user selected outlet water temperature;
said actuator being operatively connected to said valve member for controlling axial movement of said valve member between said hot and cold seats;
wherein during operation,
said hot seat is fixed and said cold seat is movable toward and away from said hot seat to set the user selected flow rate, and
said actuator is operatively connected to said cold seat by a flow coupling device for converting one of pivotal and rotational movement of said actuator into axial movement of said cold seat to set the user selected outlet water flow rate, and
said actuator is coupled to said valve member by a temperature coupling device for converting the other of pivotal and rotational movement of said actuator into axial movement of said valve member to set the user selected outlet water temperature, wherein during shut off of water flow, said valve member is in direct contact with each of said hot seat and said cold seat, wherein said temperature coupling device and flow coupling device are configured to permit rotational movement and pivotal movement of said actuator independently of each other such that the water temperature and flow rate are adjustable independently of each other by separate rotational and pivotal movement of said actuator, and wherein said temperature coupling device and flow coupling device are also configured to permit simultaneous rotational movement and pivotal movement of said actuator such that the water temperature and flow rate are adjustable simultaneously by a combination of the rotational and pivotal movement of said actuator.

2. The thermostatic mixing valve according to claim 1, wherein said temperature coupling device acts on said valve member via a thermostat arranged to monitor outlet water temperature and adjust said valve member to maintain the selected outlet water temperature substantially constant.

3. The thermostatic mixing valve according to claim 1, wherein said actuator is manually rotatable about a first axis for altering one of the water temperature and flow rate and is manually pivotal about a second axis for altering the other of the water temperature and flow rate.

4. The thermostatic mixing valve according to claim 3, wherein said second, pivotal axis is transverse to said first, rotational axis.

5. The thermostatic mixing valve according to claim 3, wherein said actuator is rotatable to adjust water temperature and pivotal to adjust flow rate.

6. The thermostatic mixing valve according to claim 1, wherein said actuator includes a control handle pivotally mounted on a rotatable control base such that said control handle and control base can be rotated for controlling outlet water temperature and said control handle can be pivoted on the control base for controlling flow rate.

7. The thermostatic mixing valve according to claim 6, wherein said control base is rotatable about a first axis for setting the user selected outlet water temperature and said control handle is pivotal about a second axis transverse to the first axis for setting the user selected outlet flow rate.

8. The thermostatic mixing valve according to claim 6, wherein rotation of said control base is converted into axial movement of said valve member between said hot and cold seats for controlling outlet water temperature and pivotal movement of said control handle is converted into relative axial movement of said hot and cold seats for controlling the outlet water flow rate.

9. A thermostatic mixing valve comprising:
a manually operable actuator for user selection of water temperature and flow rate,
a proportioning valve for controlling mixing of hot and cold water according to user selection of outlet water temperature, said proportioning valve comprising a valve member movable between hot and cold seats to set the user selected outlet water temperature;
said actuator being operatively connected to said valve member for controlling axial movement of said valve member between said hot and cold seats;
wherein during operation,
said cold seat is fixed and said hot seat is movable toward and away from said cold seat to set the user selected flow rate, and
said actuator is operatively connected to said hot seat by a flow coupling device for converting one of pivotal and rotational movement of said actuator into axial movement of said hot seat to set the user selected outlet water flow rate, and
said actuator is coupled to said valve member by a temperature coupling device for converting the other of pivotal and rotational movement of said actuator into axial movement of said valve member to set the user selected outlet water temperature,
wherein during shut off of water flow, said valve member is in direct contact with each of said hot seat and said cold seat,
wherein said temperature coupling device and flow coupling device are configured to permit rotational movement and pivotal movement of said actuator independently of each other such that the water temperature and flow rate are adjustable independently of each other by separate rotational and pivotal movement of said actuator, and
wherein said temperature coupling device and flow coupling device are also configured to permit simultaneous rotational movement and pivotal movement of said actuator such that the water temperature and flow rate are adjustable simultaneously by a combination of the rotational and pivotal movement of said actuator.

10. The thermostatic mixing valve according to claim 9, wherein said temperature coupling device acts on said valve member via a thermostat arranged to monitor outlet water temperature and adjust said valve member to maintain the selected outlet water temperature substantially constant.

11. The thermostatic mixing valve according to claim 9, wherein said actuator is manually rotatable about a first axis for altering one of the water temperature and flow rate and is manually pivotal about a second axis for altering the other of the water temperature and flow rate.

12. The thermostatic mixing valve according to claim 11, wherein said second, pivotal axis is transverse to said first, rotational axis.

13. The thermostatic mixing valve according to claim 11, wherein said actuator is rotatable to adjust water temperature and pivotal to adjust flow rate.

14. The thermostatic mixing valve according to claim 9, wherein said actuator includes a control handle pivotally mounted on a rotatable control base such that said control handle and control base can be rotated for controlling outlet water temperature and said control handle can be pivoted on the base for controlling flow rate.

15. The thermostatic mixing valve according to claim 14, wherein said control base is rotatable about a first axis for setting the user selected outlet water temperature and said control handle is pivotal about a second axis transverse to the first axis for setting the user selected outlet flow rate.

16. The thermostatic mixing valve according to claim 14, wherein rotation of said control base is converted into axial movement of said valve member between said hot and cold seats for controlling outlet water temperature and pivotal movement of said control handle is converted into relative axial movement of said hot and cold seats for controlling the outlet water flow rate.

* * * * *